United States Patent
Bagepalli et al.

[19]

[11] Patent Number: 6,131,910
[45] Date of Patent: *Oct. 17, 2000

[54] BRUSH SEALS AND COMBINED LABYRINTH AND BRUSH SEALS FOR ROTARY MACHINES

[75] Inventors: Bharat S. Bagepalli, Schenectady; R. Paul Chiu, Scotia; Robert Harold Cromer, Johnstown, all of N.Y.; Gregory Allan Crum, Greenville, S.C.; Osman Saim Dinc, Istanbul, Turkey; Anthony Holmes Furman, Scotia, N.Y.; Paul Thomas Marks, Clifton Park, N.Y.; Rudolf Matthias Markytan, Niskayuna, N.Y.; David Robert Skinner, Pattersonville, N.Y.; Norman Arnold Turnquist, Cobleskill, N.Y.; Christopher Edward Wolfe, Niskayuna, N.Y.

[73] Assignee: General Electric Co., Schenectady, N.Y.

[ * ] Notice: This patent is subject to a terminal disclaimer.

[21] Appl. No.: 08/855,013

[22] Filed: May 13, 1997

Related U.S. Application Data

[60] Continuation-in-part of application No. 08/438,228, May 9, 1995, Pat. No. 6,010,132, which is a division of application No. 08/342,011, Nov. 16, 1994, Pat. No. 5,474,306, which is a continuation of application No. 07/978,731, Nov. 19, 1992, abandoned.

[51] Int. Cl.$^7$ ................................................ F16J 15/447
[52] U.S. Cl. .......................................... 277/355; 277/418
[58] Field of Search .................................. 277/347, 350, 277/351, 355, 914, 418, 419, 420; 415/170.1, 173.5, 173.3, 174.2, 174.5, 230, 231

[56] References Cited

U.S. PATENT DOCUMENTS

| | | |
|---|---|---|
| 768,593 | 8/1904 | Emmet et al. |
| 779,785 | 1/1905 | Junggren . |
| 910,472 | 1/1909 | Junggren . |
| 957,887 | 5/1910 | Junggren . |

(List continued on next page.)

FOREIGN PATENT DOCUMENTS

| | | |
|---|---|---|
| 0453315 A1 | 10/1991 | European Pat. Off. . |
| 2938-484 | 3/1981 | Germany . |
| 3-209068 | 9/1991 | Japan . |

(List continued on next page.)

OTHER PUBLICATIONS

"Brush Seal Development for Large Industrial Gas Turbines," Chupp et al., 31$^{st}$ AIAA/ASME/SAE.ASEE Joint Propulsion Conference and Exhibit, Jul. 10–12, 1995.

(List continued on next page.)

*Primary Examiner*—Anthony Knight
*Assistant Examiner*—John L. Beres
*Attorney, Agent, or Firm*—Nixon & Vanderhye

[57] ABSTRACT

Brush seals are retrofitted into existing turbine labyrinth seal rings to create a fail-safe seal design at locations wherever labyrinth seals are currently used, including interstage shaft seals, rotor end seals, bucket (or blade) tip seals and spill strips. Brush seals, per se, when used in place of labyrinth seals, can result in considerable span reductions of steam turbines, or machines with more turbine stages for a given span. Application to end packings results in the potential elimination of gland sealing/exhauster systems. Brush seal life can be improved by retrofitting brush segments to labyrinth seal segments that are either spring-backed, or use pressure loads to obtain design clearances only after steady state operating conditions are achieved. The brush seals are provided with backing plates shaped like labyrinth teeth, resulting in a fail-safe design. Also, the use of existing labyrinth teeth as bristle backing plates results in a brush seal with diminished susceptibility to hysteresis when compared to conventional brush seal designs. Low friction coatings can also be used to reduce brush seal hysteresis. Incorporation of brush seals in labyrinth seal rings that are either spring-backed or held in place by pressure forces results in extremely low brush seal wear.

11 Claims, 10 Drawing Sheets

U.S. PATENT DOCUMENTS

| | | |
|---|---|---|
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kégresse . |
| 1,651,855 | 12/1927 | Warren . |
| 1,670,071 | 5/1928 | Junggren . |
| 1,895,930 | 1/1933 | Junggren . |
| 2,336,323 | 12/1943 | Warren . |
| 2,543,615 | 2/1951 | Trumpler . |
| 2,600,991 | 6/1952 | Hargrove . |
| 2,709,338 | 5/1955 | Morley et al. . |
| 3,186,168 | 6/1965 | Ormerod et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,358,120 | 11/1982 | Moore . |
| 4,403,779 | 9/1983 | Wilkinson . |
| 4,415,309 | 11/1983 | Atterbury . |
| 4,422,288 | 12/1983 | Steber . |
| 4,541,741 | 9/1985 | Woodbridge . |
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Wörhl . |
| 4,785,623 | 11/1988 | Reynolds . |
| 4,809,990 | 3/1989 | Merz . |
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 | 6/1991 | Hoffelner . |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,181,827 | 1/1993 | Pellow et al. . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,597,167 | 1/1997 | Snyder . |
| 5,599,026 | 2/1997 | Sanders et al. . |
| 5,630,590 | 5/1997 | Bouchard et al. . |

FOREIGN PATENT DOCUMENTS

| | | |
|---|---|---|
| 2 191 825 | 12/1987 | United Kingdom . |
| 2 301 635 | 12/1996 | United Kingdom . |
| WO92/05378 | 4/1992 | WIPO . |

OTHER PUBLICATIONS

"Positive Pressure Variable Clearance Packing," Morrison et al.,; GE Turbine Reference Library, May 1990.

FIG. 1 *(PRIOR ART)*
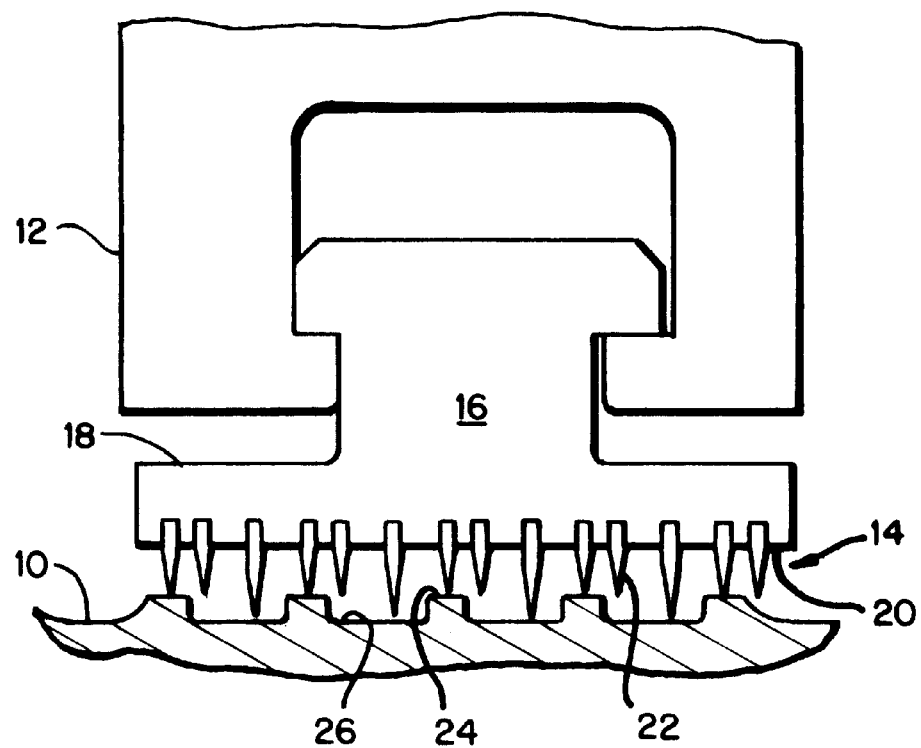
FIG. 2 *(PRIOR ART)*
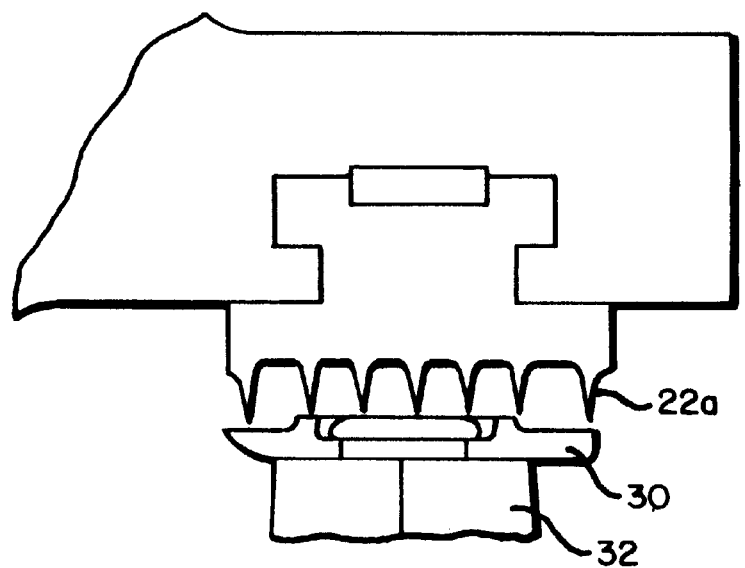

BRUSH SEALS AND COMBINED LABYRINTH AND BRUSH SEALS FOR ROTARY MACHINES

RELATED APPLICATIONS

This application is a continuation-in-part of application Ser. No. 08/438,228, filed May 9, 1995, now U.S. Pat. No. 6,010,132 which in turn is a division of application Ser. No. 342,011, filed Nov. 16, 1994, now U.S. Pat. No. 5,474,306 and which in turn is a continuation of application Ser. No. 978,731, filed Nov. 19, 1992, now abandoned, the disclosures of which are incorporated herein by reference.

TECHNICAL FIELD

The present invention relates to brush seals for rotary machines such as steam and gas turbines and particularly relates to brush seals and labyrinth-brush seal combinations, as well as to methods for retrofitting brush seals in the flow path of the rotary machine to provide labyrinth-brush seal combinations.

BACKGROUND

Rotary machines, such as steam and gas turbines, used for power generation and mechanical drive applications are generally large machines consisting of multiple turbine stages. In turbines, high pressure fluid flowing through the turbine stages must pass through a series of stationary and rotating components, and seals between the stationary and rotating components are used to control leakage. The efficiency of the turbine is directly dependent on the ability of the seals to prevent leakage, e.g., between the rotor and stator. Turbine designs are conventionally classified as either impulse, with the majority of the pressure drop occurring across fixed nozzles, or reaction, with the pressure drop more evenly distributed between the rotating and stationary vanes. Both designs employ rigid tooth, i.e., labyrinth, seals to control leakage. Traditionally, rigid labyrinth seals of either a hi-lo or straight shaft design are used. These types of seals are employed at virtually all turbine locations where leakage between rotating and stationary components must be controlled. This includes interstage shaft seals, rotor end seals, and bucket (or blade) tip seals. Steam turbines of both impulse and reaction designs typically employ rigid, sharp teeth for rotor/stator sealing. While labyrinth seals have proved to be quite reliable, their performance degrades over time as a result of transient events in which the stationary and rotating components interfere, rubbing the labyrinth teeth into a "mushroom" profile and opening the seal clearance.

Another type of seal used in many environments, including rotary machines, is a brush seal. Brush seals are generally less prone to leakage than labyrinth seals. A brush seal can also accommodate relative radial movement between fixed and rotational components, for example, between a rotor and a stator, because of the flexure of the seal bristles. Brush seals also generally conform better to surface non-uniformities. The result of using brush seals is better sustained rotary machine performance than is generally possible with labyrinth seals.

DISCLOSURE OF THE INVENTION

In accordance with a preferred embodiment of the present invention, there is provided a combination or hybrid labyrinth-brush seal in the environment of a rotary machine such as a turbine. Brush seals per se have generally applicability to rotary machines and can be used in lieu of labyrinth seals. Brush seals are advantageous in that context and provide improved sealing, while occupying considerably less axial space as compared with conventional labyrinth seals. As a result, more compact rotary machine, e.g., turbine, designs can be realized. Alternatively, by employing brush seals, the span that would normally be occupied by labyrinth teeth can be used to allow additional turbine stages, resulting in increased turbine efficiency. As a further advantage, application of brush seals at end packing locations can reduce leakage to the point that the need for a gland sealing/exhauster system, for example, in a steam turbine, is eliminated. At rotor end seals, it is also possible to use brush seals in conjunction with face seals. Further, in certain steam rotary machine applications, some leakage is desirable for cooling of components such as rotors. At these locations, brush seals can be used in conjunction with orifices or other flow bypass mechanisms to ensure that the proper amount of leakage is obtained.

A typical brush seal for use in the present invention comprises a bristle pack, i.e., bristles sandwiched between two metallic plates. The bristles are generally alloy steel wires, drawn to a diameter of 0.002–0.006 inches, although the exact diameter depends on the specific seal application. Larger wire diameters are used for seals exposed to a high pressure differential between the upstream and downstream sides. The backing (downstream) plate prevents the bristles from deflecting axially under pressure load. As a result, fence height (h) is a critical design variable. Fence height is the distance the bristles extend freely from their support, i.e., the distal end of the support plate, to their free ends, which typically are in engagement with the rotating part. For a steam turbine application, where the expected maximum radial rotor deflection is approximately 0.040 inches, the fence height must therefore be a minimum of 0.040 inches. Fence heights vary significantly, particularly in gas turbines, depending on the seal location, from 0.030 for bearing seals, to 0.120 for high pressure packing seals to 0.300 for turbine interstage seals. The forward (upstream) plate holds the bristles in place during seal fabrication.

During shaft radial excursions, the bristles must be able to temporarily deflect without buckling. In order to accommodate these excursions, the bristles are not oriented in a perfectly radial direction, but are instead canted at some angle. Typically, this angle is between 45 and 60 degrees. Increased angles are used to allow for increased radial shaft excursions.

In accordance with one aspect of the present invention, brush seals are combined with labyrinth seals and may be supplied as original equipment or retrofitted into an existing labyrinth seals. Thus, the brush seal may be provided between adjacent labyrinth teeth or at one or both ends of the seal or at various one or more locations between the teeth and at one or both ends of the seal. Advantageously, one of the labyrinth seal teeth may be used as a backing plate for each brush seal. This allows the brush seal to be incorporated into the labyrinth seal with a minimal loss, if any, of labyrinth teeth, and results in a highly fail-safe design. In addition, the tapered shape of the labyrinth tooth provides an anti-hysteresis quality to the brush seal. Hysteresis occurs when the seal is exposed to a large pressure differential, followed by a large relative radial movement which deflects the bristles. Friction forces acting on the bristles prevent them from returning to their steady-state positions until they are relieved of the large pressure load. By providing a tapered shape to the bristle backing structure, the normal force on the backing plate is reduced and the hysteresis tendency is abated.

A second method of providing anti-hysteresis capability to the brush seal is to coat the upstream surface of the backing plate with a material that has an extremely low coefficient of friction such as, for example, boron nitrate. Thus, the friction force is reduced by reducing the friction coefficient rather than the normal force.

By combining brush seals with conventional labyrinth seals, a fail-safe seal is advantageously created. The brush seal provides essentially all of the sealing capability as long as it remains intact. However, if it becomes damaged or worn, the adjacent labyrinth teeth provide sufficient sealing to enable the rotary machine, e.g., a turbine, to be operated until its next scheduled maintenance outage. The brush seals may be welded in place, or they may be mechanically fastened, e.g., by using bolts. Particularly advantageous is that brush seals can be retrofit on existing rotary machines to provide a combination labyrinth-brush seal with a minimum of modification to the extant labyrinth seal teeth. For example, a brush seal may be disposed between a pair of plates with one plate having a tongue-and-groove fit for fitting the brush seal to a labyrinth seal ring, e.g., on an end face thereof, with the brush seal being finally welded directly to the labyrinth seal ring. Alternatively, a circumferential groove may be machined in the labyrinth seal ring between adjacent teeth or at the seal ring ends. It will be appreciated that the groove may necessitate removal of one or more teeth of the labyrinth seal but this can be accomplished without deleterious effect on the performance of the resulting combination seal. The brush seal may then be slid into place and welded along the inner circumference of the interface. The brush seal backing plate may also have a profile similar to that of a labyrinth tooth, or may use an existing tooth of the labyrinth seal, resulting in a fail-safe design.

It will be appreciated that labyrinth seals in certain rotary machines, such as steam turbines, are generally segmented, with between four and eight individual segments forming the entire 360 degree seal. Each segment is held in place independently, and can typically move radially independent of the other segments. As a result, the brush seal for retrofitting in a given labyrinth seal of a steam turbine is also fabricated in sections, each section being fastened to a single labyrinth seal segment.

In most steam turbines, the labyrinth seal segments are "spring-backed." That is, they are held in place by sprung steel strips, and are free to move radially when subjected to severe rotor/seal interference. By attaching individual brush seal segments directly to the labyrinth seal segments, the brush seals are also provided with this "spring-backing" protection in the event of severe rotor rubs.

Also sometimes employed in steam turbines are springs for maintaining the labyrinth seal segments positioned radially away from the rotor. A cavity is also located on the backside of the segments which can be pressurized to close the seals to the design clearance, after the rotor has been brought to speed and any severe transients have passed. Retrofitting brush seal segments to the labyrinth seals in such an arrangement maximizes the wear life of the brushes, since the seals are not subjected to the most severe rotor/stator interferences that occur during turbine start-up and shut-down cycles.

In order to survive in a steam turbine environment, brush seals must be designed, e.g., to withstand pressures up to 3500 psig and temperatures ranging from ambient to approximately 1050° F. In addition, the steam seals must be sufficiently robust to withstand relative radial excursions of at least 0.040 inches. Seal diameters generally range from approximately 6 inches to 30 inches for shaft seals, and 30 inches to 60 inches for bucket tip seals. Rotor speed ranges from 1500 to 7500 RPM or higher.

In order to survive in a gas turbine environment, brush seals must be designed to withstand pressures up to 200 psia and temperatures ranging from ambient to approximately 1500° F. In addition, the seals must be sufficiently robust to withstand relative radial excursions. Seal diameters generally range from approximately 40 to 60" for high pressure packing seals, 15 inches to 25" for bearing seals, 35 to 70" for turbine interstage seals, and 40 inches to 120" for blade tip seals. Rotor speed ranges from 1500 to 4500 rpm.

Traditionally, brush seals have been utilized in conjunction with shafts that have been coated with a chrome carbide coating, to improve wear resistance. In order to make brush seals more economically feasible in steam and gas turbines, they can be applied to uncoated surfaces, with acceptable wear rates of both the seal and shaft. Typically, the wear pair for a brush seal on a steam turbine rotor consists of a cobalt alloy bristle material (such as Haynes 25) contacting a rotor surface of either CrMoV (for the shaft) or 12Cr (for bucket tips). Rotor materials such as Inconel 718 are possible on newer gas turbines. The shaft geometry can also be designed to mitigate wear by taking advantage of relative axial motion. If the radial interference occurs at a location other than that where the brush seal is located at steady state operation, the shaft can be grooved to decrease the interference.

An important consideration in the design of brush seals for turbines is the pressure differential across the seal. Whenever possible, it is desirable to employ brush seals that consist of a single row of bristles. However, in order to accommodate the radial shaft excursions expected in a steam turbine, as well as the high pressure drop that occurs at some turbine stages, it is sometimes necessary to employ brush seals consisting of two or more bristle packs in series. In multiple-stage brush seals, it is common for flow leaking beneath the upstream bristle pack to induce a vortex between the bristle packs, and for this vortex to be damaging to the following row of bristles. Specifically, the vortex can be such that the flow on the upstream side of the second row of bristles is radially outward, tending to pull the bristle pack apart and damaging the seal. To prevent this phenomenon from occurring in a gas turbine, according to the present invention, a radial step may be provided in the rotor between the two bristle packs with the two bristle packs lying at the two different diameters. With appropriate axial location of the rotor step, this arrangement results in a reversal of the flow direction at the upstream edge of the second bristle pack. Such a seal, in which the flow is radially inward along the bristles, is very effective.

In a steam turbine, however, the large relative axial movements that take place between the rotor and stator during transients preclude use of rotor steps as a method of preventing flow-induced damage of multiple stage brush seals. Instead, the pair of bristle packs may be axially separated by a section of conventional labyrinth teeth and the downstream bristle pack is thus virtually unaffected by the presence of the upstream bristle pack. In a turbine seal that normally consists of two or more labyrinth rings, one single stage brush seal can be retrofit into each of the labyrinth seal rings, resulting in an effective two or multi-stage brush seal. An additional advantage to this arrangement is that it is a fail-safe design. That is, if the brush seal should fail for any reason, the labyrinth seal is still present, and will provide sufficient sealing for the turbine to operate until its next scheduled maintenance outage.

The combination labyrinth-brush seal described herein is applicable in steam turbines to bucket tip seals, shaft seals, and spill strips. For example, a brush seal may be retrofit to a labyrinth seal ring at the tip of a steam turbine rotating bucket using the tongue-and-groove geometry or a grooved arrangement previously described. The brush seal can be mounted at any axial location along the labyrinth seal ring, and can be either welded in place or fastened mechanically. In addition to the relative radial rotor/stator movements that the shaft seals must withstand, bucket tip seals must endure any surface discontinuities that exist between individual buckets or bucket covers and the stator which makes the combined labyrinth-brush seal hereof ideal for that purpose.

In addition to the bucket tip seals, root radial spill strips may also employ the labyrinth-brush seal combination. Any of the mounting arrangements discussed earlier for combination seals are also applicable to the spill strip seals. Again, a fail-safe seal is provided by mounting the brush seal in tandem with a labyrinth seal including providing the brush seal backing plate with a labyrinth tooth profile in an original equipment seal, or utilizing an existing labyrinth tooth as the backing plate.

Significantly, the labyrinth-brush seal combinations described here are applicable to impulse turbines, as well as reaction turbines. Impulse turbines are generally of a wheel and diaphragm construction, while reaction turbines generally utilize what is commonly referred to as a drum rotor. For application to reaction turbines with drum rotors, the brush seals may be attached to the inner surface of the stationary blades in combination with the existing labyrinth seals or installed as original equipment. For both turbine designs, it is also possible to attach the brush seals to the rotating, rather than the stationary, components.

The brush seals themselves can either be in a ring form or the seals can be fabricated in a linear sense. The fabricated seals can be in the form of an "L" shape, a "T" shape, or a "Y" shape down the linear length of the fabricated seal. When the linear sealing strip (regardless of its cross-section shape) is needed, it can be "rolled" into a given diameter and cut into various segments. This rolled and segmented seal can then be similarly joined to the steam turbine seal elements in the same fashion. This linear seal overcomes the requirement for having new tooling for each different seal diameter required in the steam turbine. Since there are thousands of different sealing diameters across the steam turbine product line, the result of the linear seal is a considerable reduction in tooling cost. The fabricated and rolled linear seal can be provided with "extra" material on its sheet metal components, so that the cross section may be machined to fit the seal into slots.

On seals where multiple segments (arcs) are needed, the hot end-gap clearance between each seal segment becomes a major source of the greatly reduced leakage of the combined labyrinth-brush seal or labyrinth-fabricated linear brush seal. To further control this leakage, a tightly rolled-up section of the same cloth utilized in fabricating the linear seal may be spot welded or affixed to the segment end. As the segments are brought to operating temperature, they will grow together, crushing the tightly rolled cloth and thereby vastly reduce the gap leakage. The overall seal performance will thus be greatly improved.

In a preferred embodiment according to the present invention, there is provided in a rotary machine having a rotatable component and a component fixed against rotation, the components lying about a common axis, and a labyrinth seal between the components including at least one generally circumferentially extending tooth carried by one of the components and projecting generally radially toward the other of the components to effect a seal therebetween, a method of forming a combination labyrinth and brush seal between the components, comprising the steps of retrofitting a circumferential array of discrete bristles on the one component axially adjacent the one tooth by securing the array to the one component with the bristles lying in a plane generally normal to the axis and with the distal ends thereof projecting toward the other component beyond the radial extent of the one tooth for substantial sealing engagement with the other component.

In a further preferred embodiment according to the present invention, there is provided a rotary machine comprising a rotatable component, a component fixed against rotation, the components lying about a common axis, a labyrinth seal between the components including a plurality of axially spaced circumferentially extending teeth carried by one of the components and projecting radially toward the other of the components to effect a labyrinth seal therebetween, a brush seal between the components, including a circumferential array of discrete bristles carried by the one component for disposition axially adjacent at least one of the teeth, and means for securing the array of bristles to the one component with the bristles lying in a plane generally normal to the axis and with the distal ends thereof projecting toward the other component beyond the radial extent of the teeth for substantial sealing engagement with the other component.

In a still further preferred embodiment according to the present invention, there is provided a labyrinth seal for a rotating machine comprising a plurality of axially spaced and radially extending teeth and at least one circumferential array of discrete bristles projecting beyond the radial extent of the teeth.

In a still further preferred embodiment according to the present invention, there is provided a method of effecting sealing in a rotating turbomachine having a labyrinth packing with multiple rows of axially spaced circumferentially extending seal teeth to prevent fluid flow between rotating and stationary components thereof, comprising the step of replacing at least one tooth with a brush seal.

In a still further preferred embodiment according to the present invention, there is provided a method of repairing a segment of toothed labyrinth packing for a turbomachine comprising the step of replacing at least one tooth with a brush seal.

Accordingly, it is a primary object of the present invention to provide novel and improved brush seals and combination labyrinth-brush seals for sealing between fixed and rotating components of rotating machinery and methods of retrofitting existing rotating machinery with brush seals to effect fail-safe combination labyrinth-brush seals.

BRIEF DESCRIPTION OF THE DRAWINGS

FIG. 1 is a schematic illustration of a sealing ring segment illustrating a labyrinth seal about a rotor;

FIG. 2 is a schematic illustration of a labyrinth seal between a sealing ring segment and the covers for buckets or blades of a rotating component;

BEST MODE FOR CARRYING OUT THE INVENTION

Figure 3:
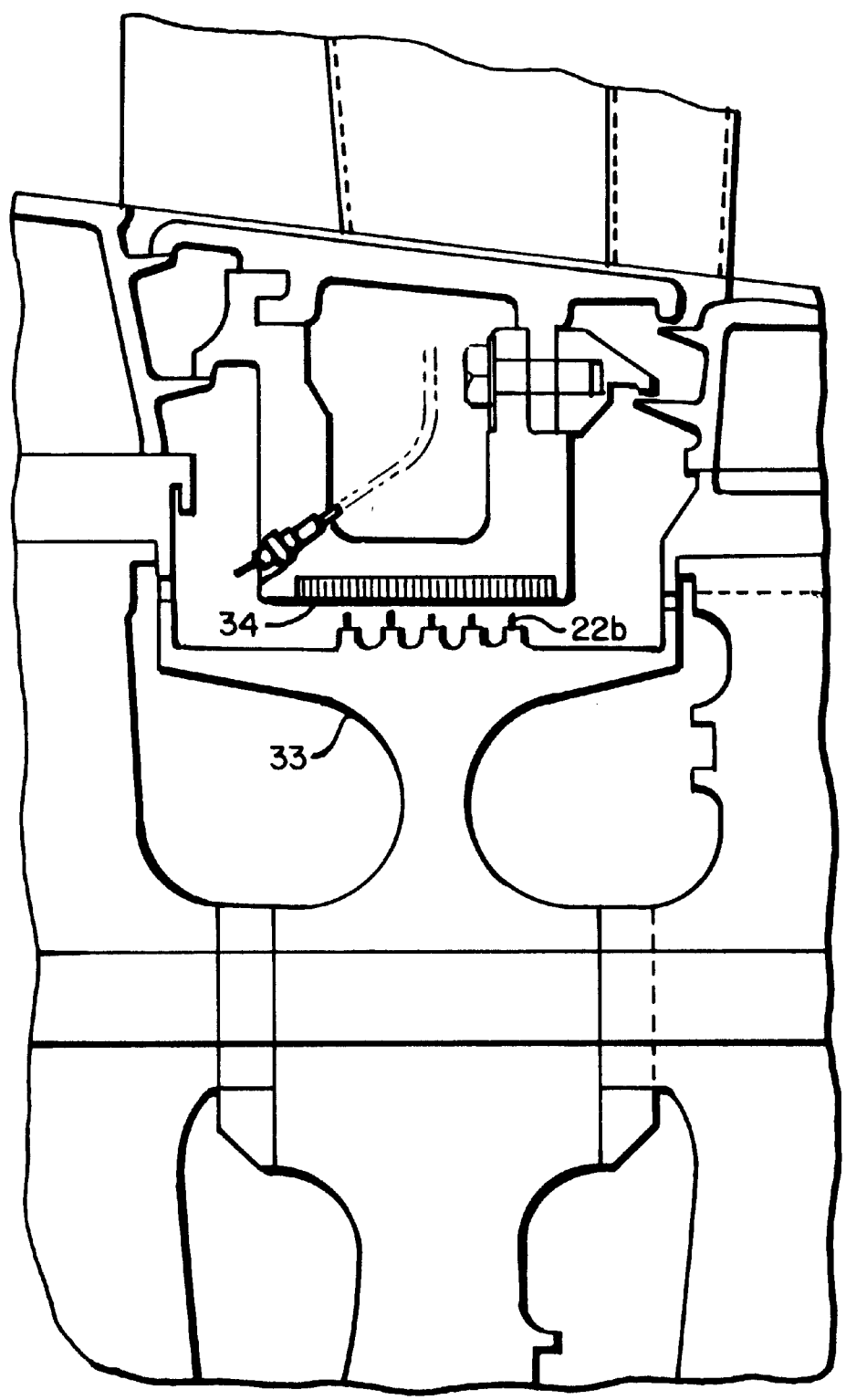
FIG. 3 is a schematic illustration of a turbine wheel illustrating a labyrinth seal between the wheel and a fixed component of the turbine.

Referring now to the drawing figures, particularly to FIG. 1, there is illustrated a portion of a rotary machine, for example, a steam turbine, having a turbine shaft 10 disposed in a turbine housing 12 and which shaft 10 is supported by conventional means, not shown, within turbine housing 12. A labyrinth seal, generally designated 14, between the rotating shaft 10 and the stationary housing 12, includes a seal ring 16 disposed about shaft 10 separating high and low pressure regions on axially opposite sides of the ring. It will be appreciated that while only one seal 16 is disclosed, typically multiple-stage labyrinth seals are provided about rotor shafts. Each seal ring 16 is formed of an annular array of a plurality of arcuate seal elements 18 having sealing faces 20 and a plurality of radially projecting, axially spaced teeth 22. The teeth are of a hi-lo design for obtaining close clearances with the radial projections or ribs 24 and the grooves 26 of the shaft 10. The labyrinth seal functions by placing a relatively large number of barriers, i.e., the teeth, to the flow of fluid from a high pressure region to a low pressure region on opposite sides of the seal, with each barrier forcing the fluid to follow a tortuous path whereby pressure drop is created. The sum of the pressure drops across the labyrinth seal is by definition the pressure difference between the high and low pressure regions on axially opposite sides thereof. These labyrinth seal ring segments are typically spring-backed and are thus free to move radially when subjected to severe rotor/seal interference. In certain designs, the springs maintain the seal ring segments 16 radially outwardly away from the rotor, for example, during startup and shutdown, with fluid pressure being supplied between the seal ring segments and the rotor housing to displace the seal ring segments radially inwardly to obtain a lesser clearance with the rotor, i.e., close the seals, after the rotor has been brought up to speed.

FIG. 2 illustrates a similar arrangement of a labyrinth seal employed at the tip of the rotating blades or turbine buckets for the rotating machine. Thus, in FIG. 2, the labyrinth seal teeth 22a lie in sealing relation to a bucket cover 30 formed on one or more turbine buckets 32. The principal of operation of the labyrinth seal at this location is similar as described above.

FIG. 3 illustrates a typical honeycomb-type labyrinth seal, for example, in a gas turbine. The labyrinth seal teeth 22b are mounted on the rotor wheel 33 and lie in radial opposition to a honeycomb structure 34 forming part of the stator. Thus, it will be appreciated that the labyrinth seal teeth may be disposed on the rotating component of the rotary machine.

Figure 4:
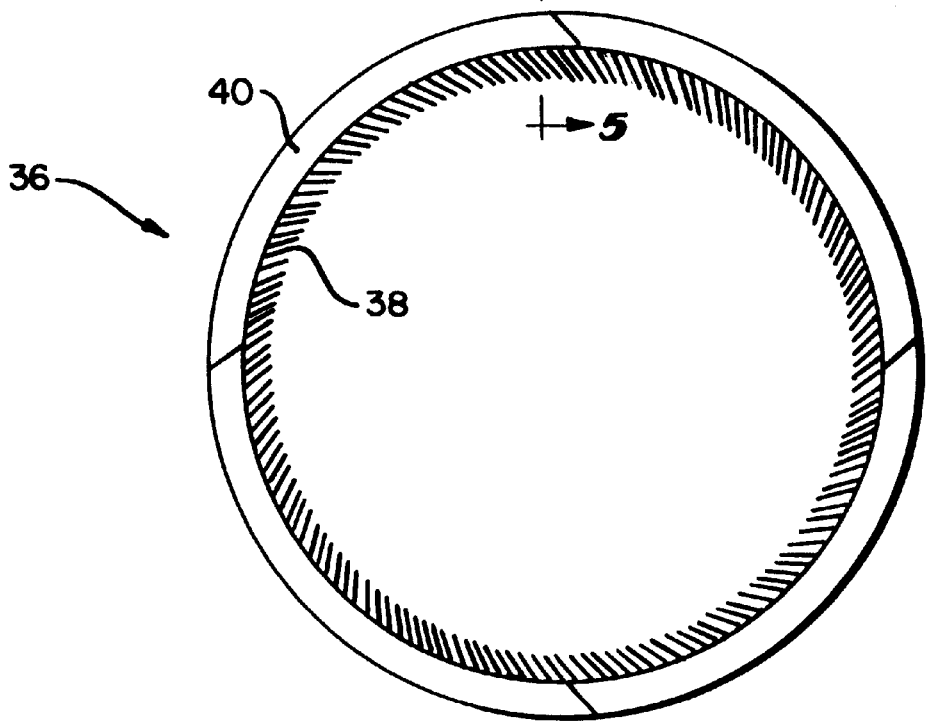
FIG. 4 is an end elevational view of a segmented brush seal.
Figure 5:
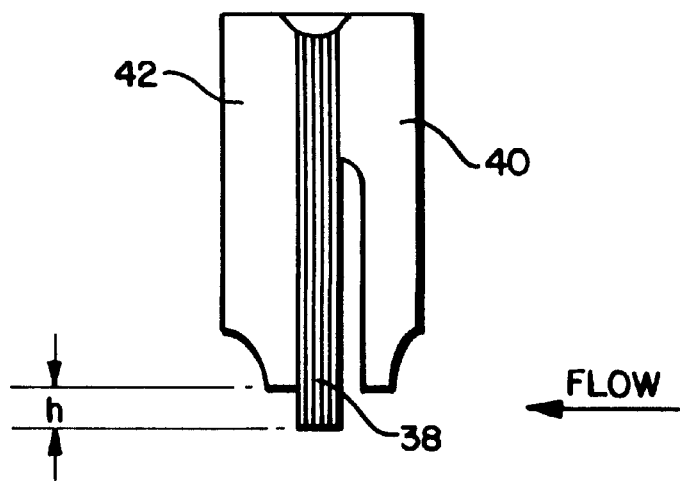
FIG. 5 is an enlarged cross-sectional view thereof taken generally about on line 5—5 in FIG. 4.

Referring now to FIGS. 4 and 5, a typical brush seal, generally designated 36, includes a plurality of bristles 38 extending generally in a radial direction and which bristles 38 are disposed or sandwiched between a pair of seal plates 40 and 42. The bristles are generally formed of alloy steel wire drawn to a diameter of 0.002–0.006 inches, although larger-diameter wires for use in higher pressure environments may be used. From a review of FIG. 5, it will be seen that the backing plate 42 prevents deflection of the bristles 38 under the loading from an upstream direction of the flow, while the distal ends of the bristle project from the distal edge of the plate 42 to engage the opposite component, e.g., the rotating shaft or wheel of a rotary machine. The bristles 38 are preferably welded between the plates 40 and 42. Additionally, it will be seen from a review of FIG. 4 that the bristles and plates are provided in segments about the circumference of the axis of the rotating machine.

Referring to FIG. 5, the bristles project from the distal end of backing plate 42 a distance h which corresponds to the maximum deflection of the rotor in a radial direction. Consequently, the distance h must be a minimum corresponding to that maximum deflection and is dependent on the expected relative radial deflection for the specific machine and seal location. It may be on the order of 0.040 inches. Note also that the upstream plate 40 is useful for maintaining the bristles in place during seal fabrication, although plate 40 is not necessary to the seal when in use if axial space is at a premium. It will also be noted in FIG. 4 that the bristles 38 extend along paths which are misaligned with the radius of the rotary machine. Thus, the bristles extend at an angle, preferably a common angle of approximately 45–60° to accommodate radial excursions of the shaft whereby the bristles may deflect without buckling.

Figure 6:
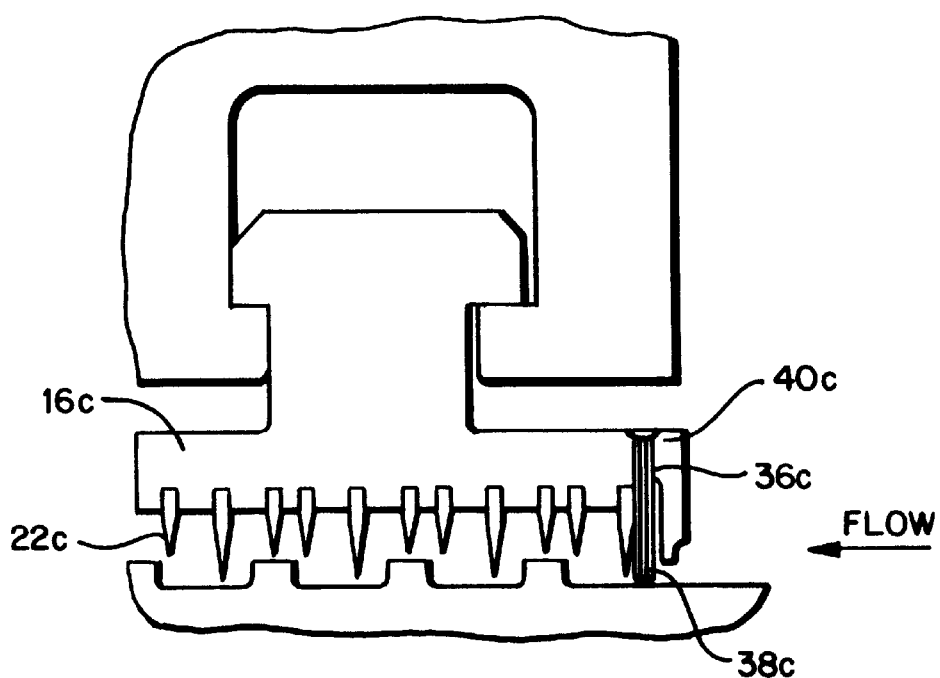
FIG. 6 is a fragmentary cross-sectional view illustrating a combined labyrinth-brush seal according to the present invention.
Figure 7:
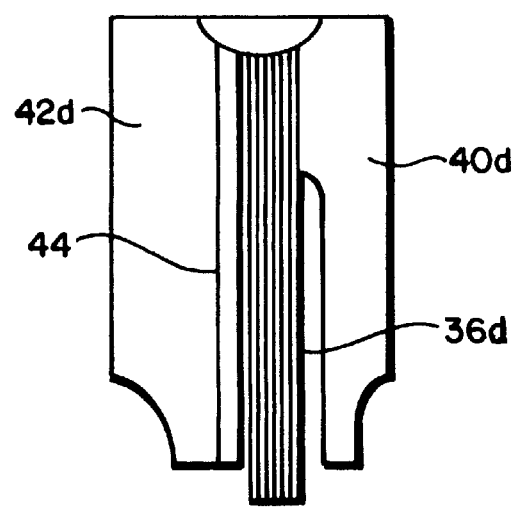
FIG. 7 is an enlarged view of a form of brush seal employed in the present invention.
Figure 6A:
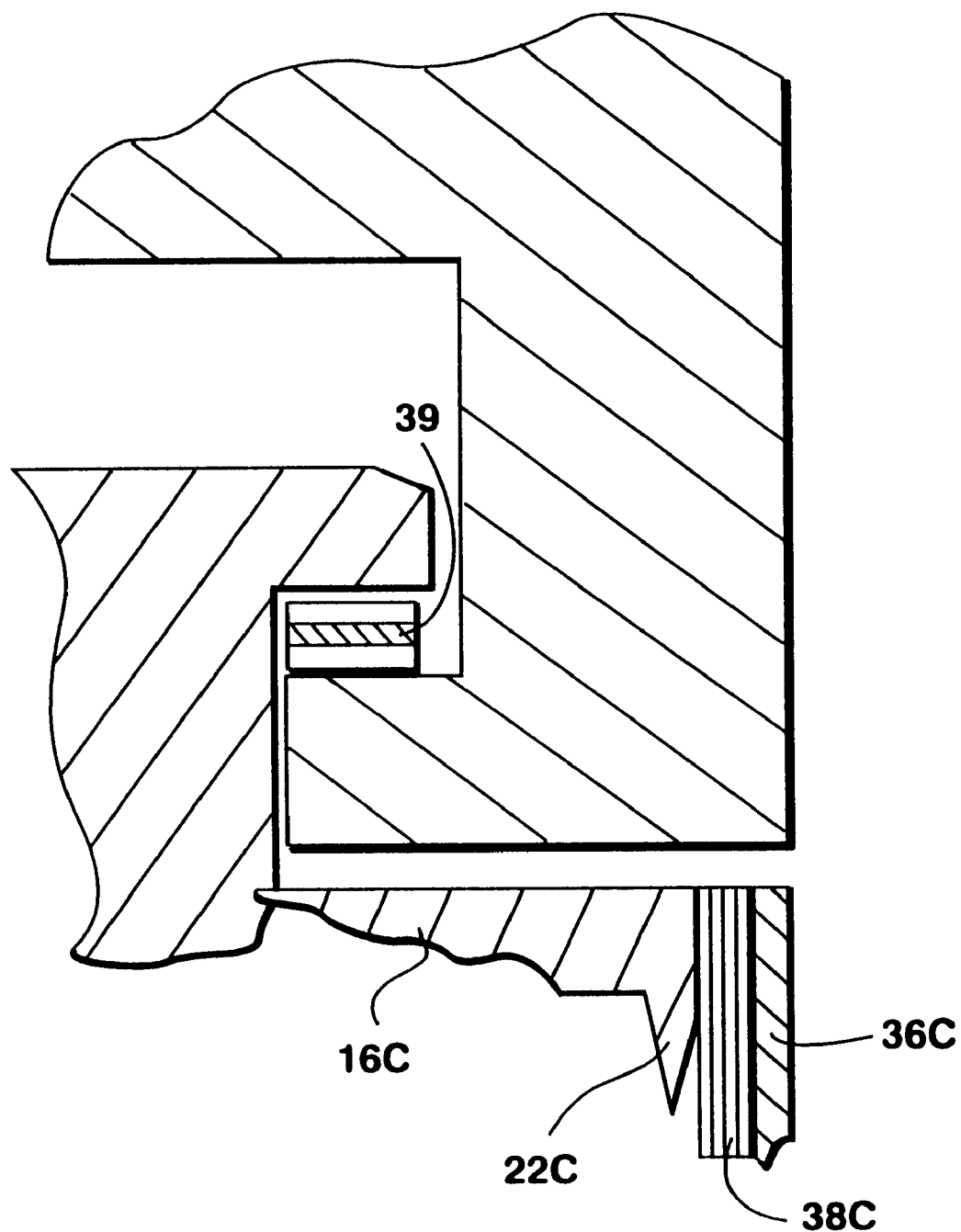
FIG. 6a is an enlarged fragmentary cross-sectional view of the upstream end of the sealing segment with combined labyrinth brush-seal illustrated in FIG. 6.

In accordance with one embodiment of the present invention, there is provided a combination labyrinth-brush seal. For example, in FIG. 6, the combination seal is illustrated with the brush seal lying at and along the axially upstream end of the sealing ring segment 16c with the teeth 22c of the labyrinth seal being located downstream of the brush seal 36c. In the illustrated embodiment, the bristles 38c of the brush seal 36c are disposed between an upstream clamping plate 40c and an end wall of the sealing ring segment 16c. The bristles may be secured, for example, by welding. Significantly, in the illustrated arrangement, one of the labyrinth teeth 22c may be employed as the backing plate on the downstream side for the bristles 38c of the brush seal 36c. Consequently, with only the addition of an end sealing plate 40c and without the loss of one or more of the labyrinth teeth, the fail-safe combination labyrinth-brush seal may be provided. In the event that the axial spacing is such that no axial increase in dimension is permitted, one or more of the labyrinth teeth 22c may be removed to accommodate securement of the brush seal 36c without increasing the axial dimension of the seal ring segment 16c. This results in a highly fail-safe design wherein, should the brush seal fail, the labyrinth teeth remain effective to provide a seal. Also, the downstream backing surface for the bristles 38c of the brush seal 36c may be tapered to provide anti-hysteresis qualities to the brush seal. By providing the tapered shape to the downstream backing for the bristles, the normal force on the backing plate is reduced and the hysteresis tendency is abated. In retrofitting a brush seal to an existing labyrinth seal segment in a rotating machine, the taper of the teeth of the labyrinth seal, e.g., the taper of tooth 22c on the downstream side of bristles 38c in FIG. 6a, provides that anti-hysteresis quality when the existing teeth are employed as the backing plate for the additional seal. A spring is illustrated at 39 in FIG. 6a, for example, for biasing the segment 16c radially outwardly. Alternatively, to provide these anti-hysteresis qualities, a low-friction coating material 44 such as boron nitrate, for example, may be provided on the upstream surface of the downstream backing plate or the upstream surface of the backing teeth of the labyrinth seal to reduce the friction force. This is illustrated in FIG. 7, wherein a backing plate 42d for the brush seal 36d is provided with the low coefficient material 44.

Figure 8:
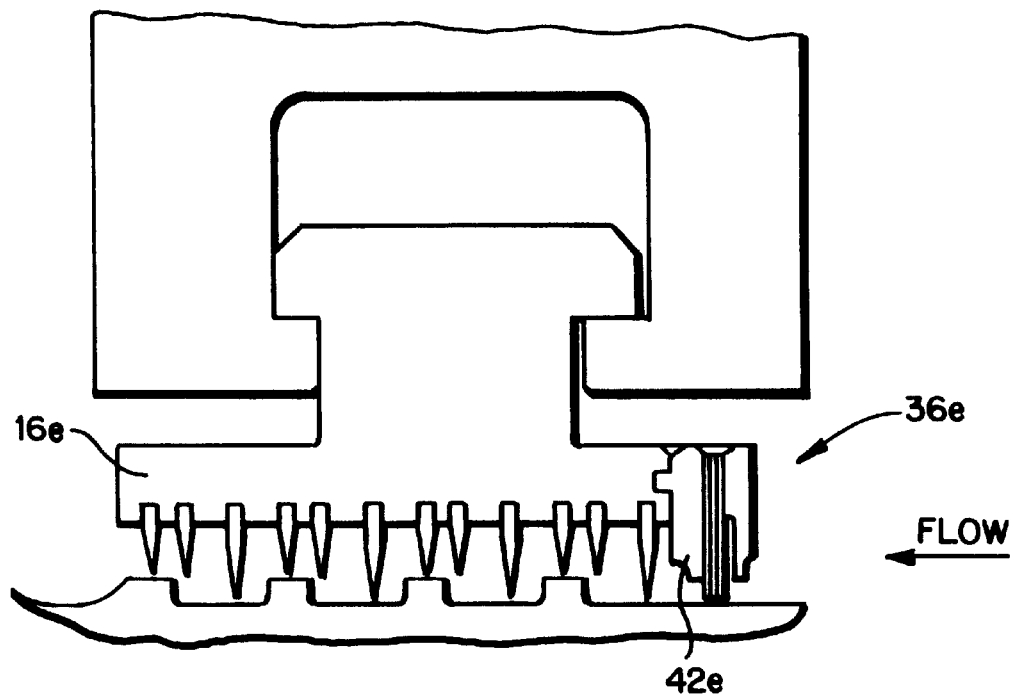
FIGS. 8 and 9 are schematic illustrations illustrating a combined labyrinth-brush seal of the present invention between sealing ring segments and a rotor.
Figure 9:
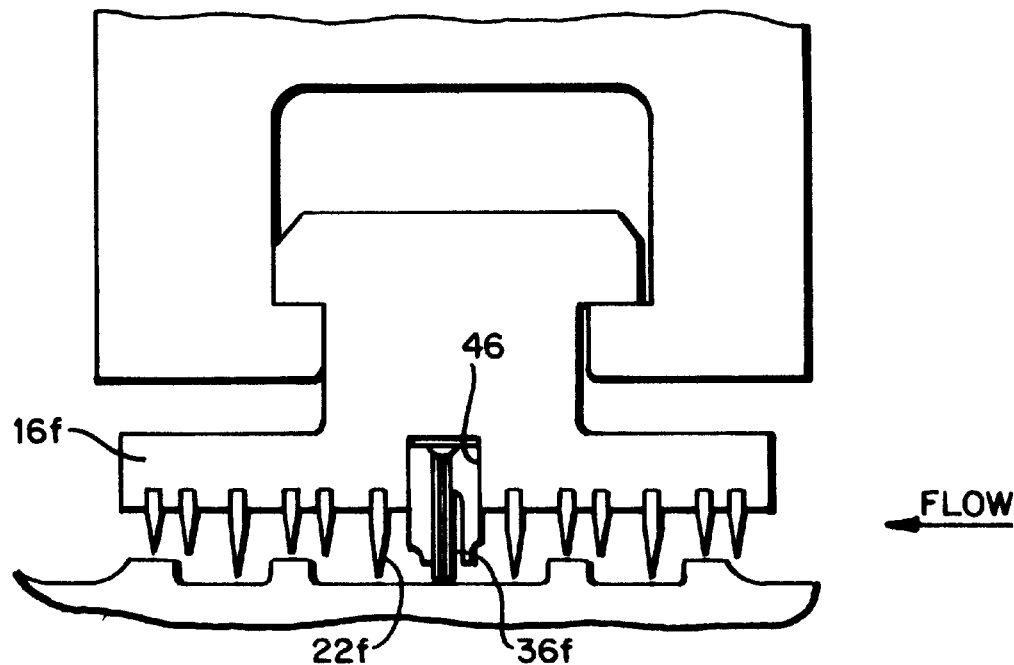

FIGS. 8 and 9 illustrate different embodiments of the combination labyrinth-brush seal of the present invention. In FIG. 8, a brush seal 36e is provided on the upstream face of the sealing ring segment 16e using a tongue-and-groove fit between the backing plate 42e of the brush seal 36e and the upstream end face of the seal ring segment 16e. The brush seal 36e may be welded to the segment 16e or mechanical fasteners such as bolts may be used. In retrofitting a brush seal to a labyrinth seal of this type, it will be appreciated that an axial extent of the end face of the seal ring segment 16e can be removed such that the brush seal 36e can be applied to form the combined labyrinth-brush seal combination hereof on seal ring segment 16e with the same resulting axial dimension as the previous labyrinth seal. As explained previously, where necessary, one or more of the end labyrinth seal teeth can be removed during this retrofit without substantial loss of sealing performance, particularly since the brush seal forms the more effective seal of the labyrinth-brush seal combination. If the brush seal fails, an effective seal using the remaining labyrinth teeth is still provided.

Referring to FIG. 9, the seal ring segment 16f may be provided with a central groove 46 along its inner face. For example, the groove 46 may be machined in the labyrinth seal ring as original equipment or during retrofit. The seal ring, for example, as illustrated in FIG. 3, can then be disposed and secured, for example, by welding in the groove. Thus, the brush seal 36f lies generally intermediate the labyrinth seal teeth 22f of the combination labyrinth-brush seal. It will be appreciated that the embodiments illustrated in FIGS. 8 and 9 may be spring-backed for radial movement and be of the positive pressure variable clearance type, for example, as disclosed in U.S. Pat. No. 5,002,288 of common assignee, the disclosure of which is incorporated herein by reference. Alternatively, the sealing ring segments may be of the type described in U.S. Pat. No. 5,375,068, of common assignee herewith, and which disclosure is also incorporated herein by reference.

Figure 10:
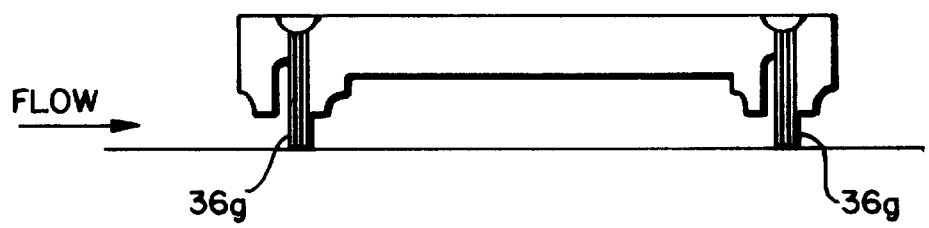
FIG. 10 is a schematic illustration of axially spaced brush seals in engagement with a rotor.
Figure 11:
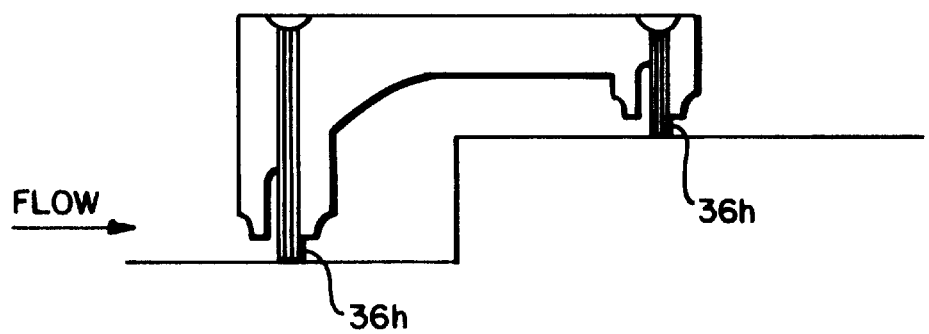
FIG. 11 is a view similar to FIG. 10 illustrating the axially spaced brush seals in conjunction with a stepped rotor.

Referring now to FIG. 10, it is often desirable to provide brush seals 36g in series between the rotating and fixed components to accommodate radial shaft excursions and the pressure drop across the seal. As illustrated in FIG. 6, two brush seals 36g are disposed at opposite ends of a fixed part to effect the seal. As explained previously, the fluid leakage between the upstream bristle pack induces a vortex between the bristle packs which may cause damage to the downstream bristle pack. To prevent this phenomena, a radial step in the rotor can be provided wherein the bristle packs 36h at opposite ends of the seal lie at different elevations, i.e., radial positions as illustrated in FIG. 11. With the bristle packs 36h at two different diameters as illustrated, the flow on the downstream bristle pack, rather than being radially outwardly and tending to pull the bristle pack apart and damaging the seal, is radially inwardly along the upstream edge of the downstream bristle pack, thus preventing damage to the downstream bristle pack. This is particularly effective in gas turbines.

Figure 12:
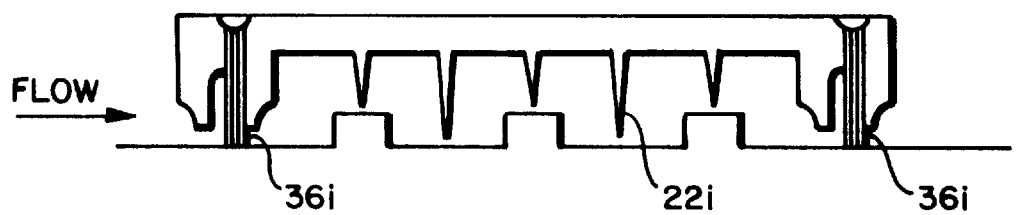
FIG. 12 is a view similar to FIG. 10 illustrating the combined labyrinth-brush seal hereof with the brush seals at opposite ends of the sealing ring segments.

In a steam turbine, it is often not feasible to provide a rotor step to take advantage of the reversed vortex flow and hence avoid damage to the downstream bristle pack. However, by separating the upstream and downstream bristle packs by labyrinth teeth 22i as illustrated in FIG. 12, the downstream bristle pack 36i is virtually unaffected by the presence of the upstream bristle pack 36i.

Figure 13:
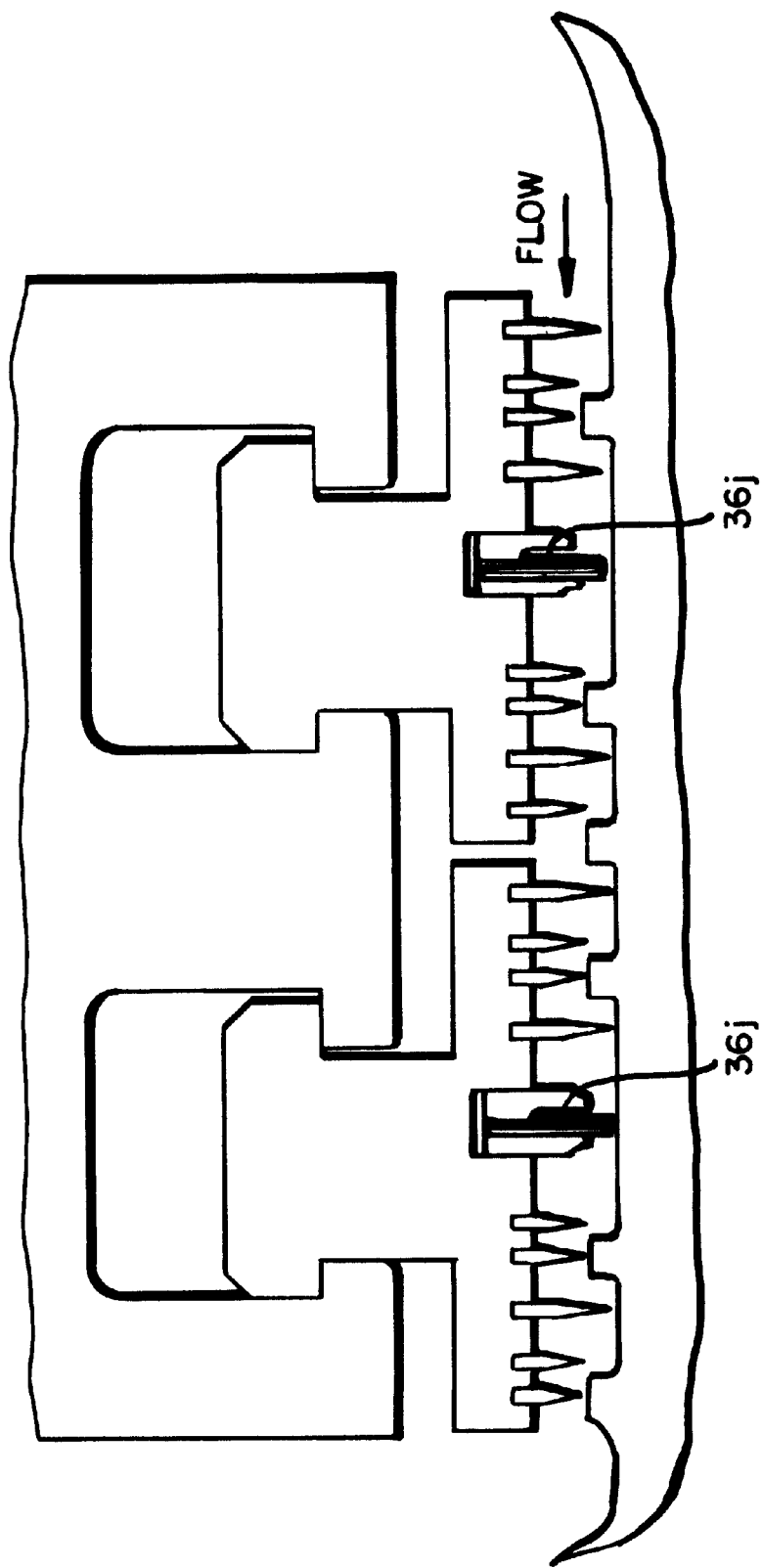
FIG. 13 is a schematic illustration of a multi-stage combined labyrinth-brush seal according to the present invention.

Consequently, bristle packs may be disposed along opposite axial ends of individual sealing ring segments or, as illustrated in FIG. 13, the bristle packs 36j may be disposed in multi-stage sealing segments at either the ends of the segments or intermediate their axial extent as illustrated. It will be appreciated that the bristle packs with the labyrinth seal teeth may be provided as original equipment or as a retrofit using the tongue-and-groove arrangement illustrated in FIG. 8 or the groove arrangement illustrated in FIG. 9.

Figure 14:
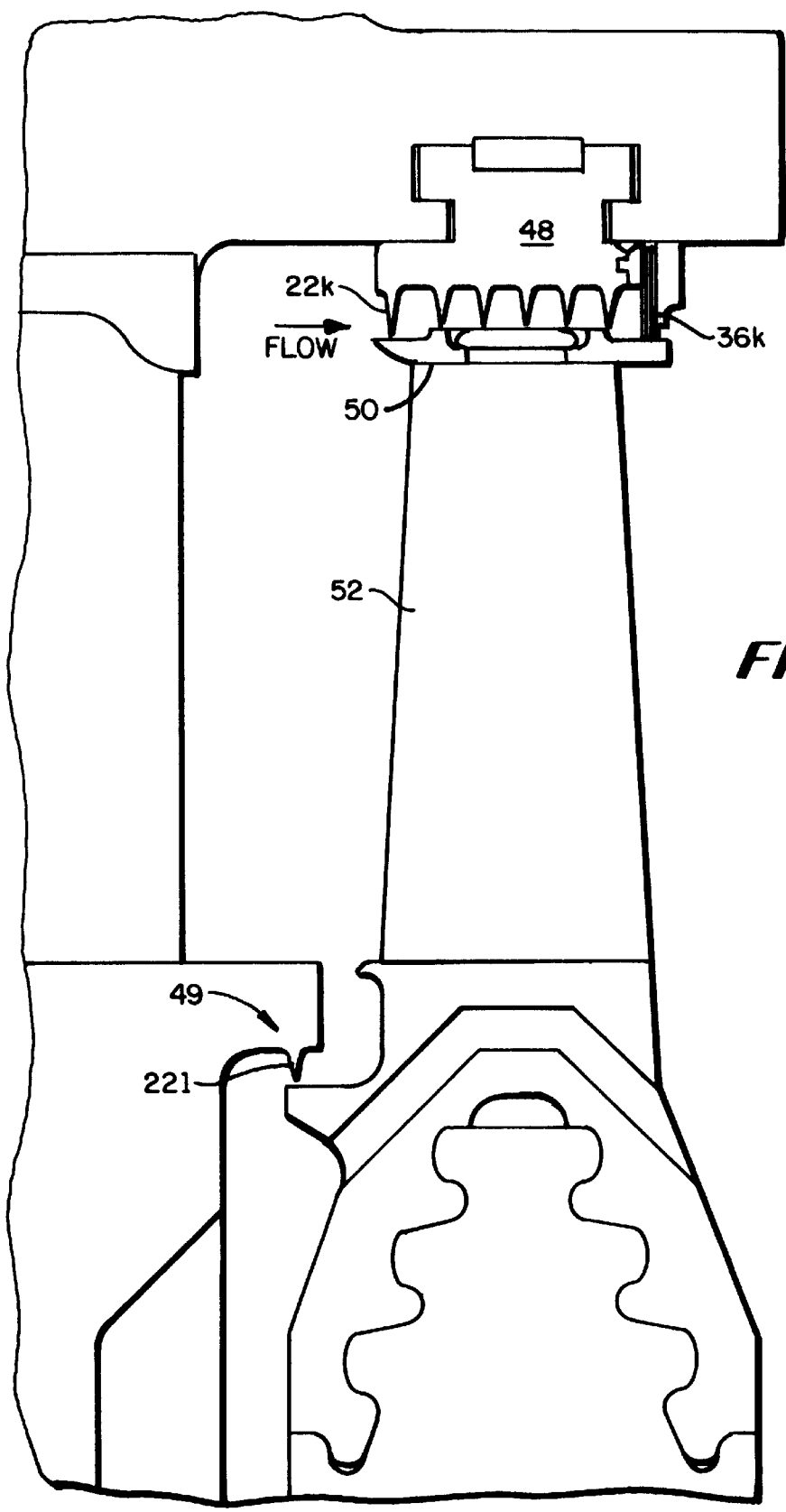
FIG. 14 is a schematic illustration of a combined labyrinth-brush seal according to the present invention between the stator and cover for rotating buckets.

Referring to FIG. 14, the combination labyrinth-brush seal hereof may be employed at the tip of a rotating blade or bucket. Thus, the brush seal 36k may be applied to an axial end of a sealing strip 48 mounting labyrinth seal teeth 22k for sealing with the bucket cover 50 of bucket 52. It will be appreciated that the end mounting of the brush seal 36k can be replaced by a grooved mounting of the brush seal 36k intermediate axially adjacent teeth similarly as illustrated in FIG. 9. As noted previously, the brush seal can be secured by welding or by mechanical means and can be provided as original equipment or as a retrofit.

FIG. 14 also illustrates a labyrinth seal tooth 22l adjacent the root of the turbine bucket or vane 52. This labyrinth tooth 22l forms a root radial spill strip seal 49. A brush seal, as previously described, may be provided at this location within the rotary machine similarly as in the previous embodiments by mounting the brush seal in tandem with the labyrinth seal, providing the brush seal backing plate with a tapered profile or applying a low coefficient of friction material thereto or utilizing an existing labyrinth tooth as the backing plate.

Figure 15A:
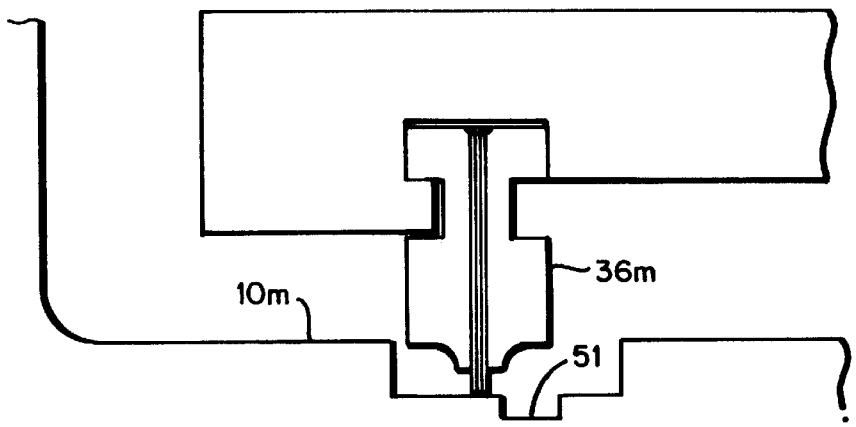
FIGS. 15A, 15B and 15C are schematic illustrations of a further form of a brush seal rotor combination in accordance with the present invention.
Figure 15B:
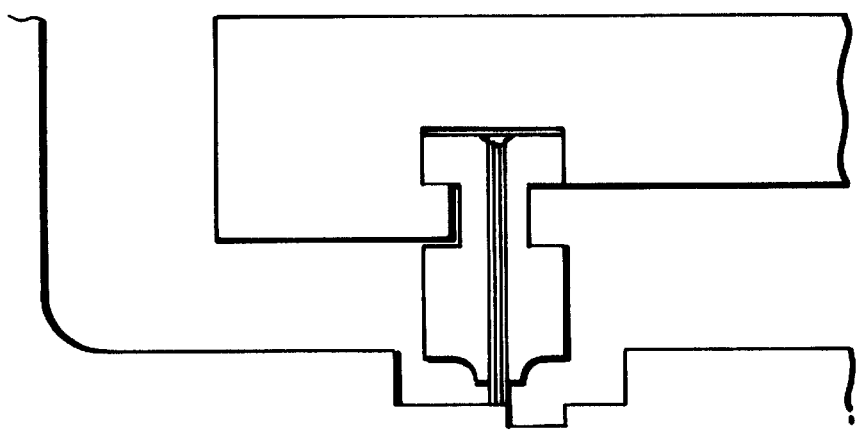
Figure 15C:
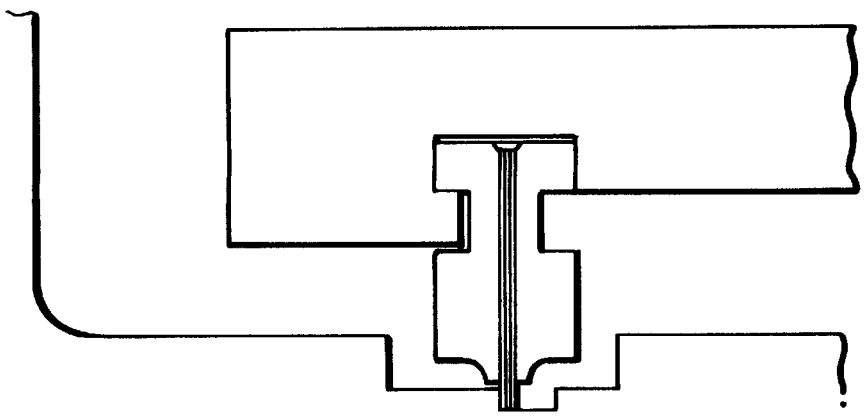

Referring now to FIG. 15, in certain instances, particularly in gas turbines, the rotating part can be particularly designed to mitigate wear on the brush seal. For example, as illustrated in FIG. 15, if the radial interference occurs at a location other than where the brush seal is located at steady-state operation, the shaft 10m may be provided with a groove 51 to decrease the interference. Thus, in FIG. 15A, the brush seal 36m is illustrated in a cold position bearing against a rotor of a certain diameter at an axial location spaced from groove 51. In FIG. 15B, the steady-state location of the brush seal is illustrated vis-a-vis the larger diameter portion of shaft 10m adjacent the rotor groove 51. In FIG. 15C, the shutdown position of the rotor and brush seal is illustrated, with the brush seal tips engaging in the groove. It will be appreciated that this form of the invention can be used with or without the labyrinth seal teeth.

It will be appreciated that existing toothed labyrinth seals may be retrofitted or repaired by replacing one or more teeth with brush seals in accordance with the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a rotary machine having a rotatable component comprised of a plurality of rotatable blades and a component comprised of a sealing strip fixed against rotation, said components lying about a common axis, said blades carrying covers adjacent radial outer ends thereof, and a labyrinth seal between said components including at least one generally circumferentially extending tooth carried by said sealing strip and projecting generally radially toward said covers to effect a seal therebetween, a method of forming a combination labyrinth and brush seal between said strip and said covers, comprising the steps of fitting a circumferential array of discrete bristles on said strip axially adjacent said at least one tooth by securing said array of discrete bristles to said strip with the bristles lying in a plane generally normal to said axis and with the distal ends thereof projecting toward said covers beyond the radial extent of said one tooth for substantial sealing engagement with said covers.

2. A method according to claim 1 including installing said array of bristles axially against an upstream side of said one tooth.

3. A method according to claim 2 including minimizing hysteresis effects in the brush seal by installing at least a portion of said array of bristles against a tapered surface of said one tooth extending at an angle relative to said axis other than a perpendicular angle.

4. A method according to claim 2 including minimizing hysteresis effects in the brush seal by applying a material having a low coefficient of friction along said upstream side of said one tooth.

5. A method according to claim 1 including disposing said array of bristles between a pair of backing plates and in multiple layers thereof in an axial direction and securing said plates to an end face of said strip.

6. A method according to claim 1 wherein said labyrinth seal includes a plurality of generally circumferentially extending axially spaced teeth carried by said strip and projecting radially toward said covers, and disposing said array of bristles in multiple layers thereof in an axial direction and on said strip intermediate an adjacent pair of said teeth.

7. A method according to claim 1 wherein said labyrinth seal includes a plurality of generally circumferentially extending axially spaced teeth carried by said strip and projecting radially toward said covers, and removing at least a portion of one of said teeth and replacing said removed tooth portion with said array of bristles.

8. A method according to claim 1 wherein said machine comprises a steam turbine including a fixed housing, said one component comprising a plurality of arcuate segments carried by said fixed housing for movement in radial directions toward and away from said axis, at least one spring for each segment biasing said segment for movement in one of said radial directions, at least one tooth being carried by an arcuate inner face of each said segment and including the step of securing at least one arcuate section of said array of bristles to each said segment, respectively, at an axially spaced position along said at least one segment relative to said teeth.

9. A method according to claim 8 including forming a groove in an inner face of each said segment, disposing an arcuate section of said array of bristles between a pair of arcuate plates and securing said bristles and plates in said grooves of said segments.

10. A method according to claim 8 including the step of securing a first array of arcuate sections of said circumferentially extending array of bristles to said segments adjacent a side thereof upstream of said teeth and securing a second array of arcuate sections of said circumferentially extending array of bristles to said segments adjacent an opposite side thereof downstream of said teeth whereby said teeth lie axially between said first and second arrays of bristles.

11. A method according to claim 8 wherein said segments carry a plurality of teeth spaced axially one from the other, and securing said arcuate sections of said array of bristles axially between said plurality of teeth on said segment.

* * * * *